United States Patent [19]
Ayral et al.

[11] Patent Number: 5,535,041
[45] Date of Patent: Jul. 9, 1996

[54] DEVICE FOR STABILIZING THE REFLECTIVITY OF MIRRORS HAVING PHASE CONJUGATION THROUGH STIMULATED BRILLOUIN SCATTERING AT HIGH PULSE REPETITION RATE

[75] Inventors: Jean-Luc Ayral, Antony; Pascal Tournois; Jean-Pierre Huignard, both of Paris, all of France

[73] Assignee: Thomson-CSF, Puteaux, France

[21] Appl. No.: 859,707

[22] PCT Filed: Nov. 8, 1991

[86] PCT No.: PCT/FR91/00877

§ 371 Date: Jun. 18, 1992

§ 102(e) Date: Jun. 18, 1992

[87] PCT Pub. No.: WO92/09005

PCT Pub. Date: May 29, 1992

[30] Foreign Application Priority Data

Nov. 16, 1990 [FR] France ................................ 90 14286

[51] Int. Cl.$^6$ ................................................ G02B 26/08
[52] U.S. Cl. ........................ 359/211; 359/210; 359/300; 359/305; 372/21
[58] Field of Search ........................ 359/300, 305, 359/285, 209–211, 813, 837, 831, 557, 814, 298; 372/107, 29, 21, 99, 15–16, 19, 20, 98, 100, 101, 102, 103, 107, 108

[56] References Cited

U.S. PATENT DOCUMENTS

| | | | |
|---|---|---|---|
| 4,491,867 | 1/1985 | Huignard | 358/209 |
| 4,500,855 | 2/1985 | Feinberg | 359/300 |
| 4,812,639 | 3/1989 | Byren et al. | 250/201.1 |
| 4,822,974 | 4/1989 | Leighton | 359/837 |
| 4,847,521 | 7/1989 | Huignard et al. | 307/425 |
| 4,877,312 | 10/1989 | Huignard et al. | 359/241 |
| 4,936,660 | 6/1990 | Clendening Jr. et al. | 359/300 |
| 5,034,627 | 7/1991 | Ayral et al. | 307/426 |
| 5,089,384 | 2/1992 | Hale | 356/36 |

FOREIGN PATENT DOCUMENTS

| | | |
|---|---|---|
| 8304145 | 11/1983 | WIPO. |
| 8803724 | 5/1988 | WIPO. |

OTHER PUBLICATIONS

Applied Physics B. Photophysics and Chemistry. vol. 36, 1985, Heidelberg De pp. 83–92; I. D. Carr et al.: "Performance of a Nd:YAG Oscillator/Amplifier with Phase–Conjugation via".

Soviet Journal Of Quantum Electronics. vol. 20, No. 7 Jul. 1990, New York US, pp. 770–772; B. I. Denker, et al.: "Compact lase with stimulated Brillouin scattering mirror operated at pulse repetition frequency up to 150 Hx".

Primary Examiner—James Phan
Attorney, Agent, or Firm—Oblon, Spivak, McClelland, Maier & Neustadt

[57] ABSTRACT

A phase conjugation mirror including a non-linear medium (1) and a focusing lens (2), in which a beam to be reflected (F1) is displaced relative to a non-linear medium. The displacement is obtained through displacement of the focusing lens and has application in the stabilization of the reflectivity of a phase conjugation mirror.

8 Claims, 2 Drawing Sheets

DEVICE FOR STABILIZING THE REFLECTIVITY OF MIRRORS HAVING PHASE CONJUGATION THROUGH STIMULATED BRILLOUIN SCATTERING AT HIGH PULSE REPETITION RATE

BACKGROUND OF THE INVENTION

1. Field of the Invention

The invention relates to a device for stabilizing the reflectivity of a phase conjugation mirror. This device is applicable to improving the reflectivity of mirrors having phase conjugation through stimulated Brillouin scattering at high pulse repetition rate.

2. Discussion of Background

Stimulated Brillouin scattering is a physical mechanism well suited to the conjugation of the phase of short pulses within the 1–10 ns range of duration. Applications relate to the correction of optical phase distortion from various causes, for example within solid-state laser media such as YAG:Nd. A geometry very often used to produce such phase conjugation mirrors is represented in FIG. 1: the incident wave which has suffered aberration is focused in the non-linear medium, which is most often a gas ($CH_4$, Xe, ... ) or a liquid (acetone ... ). Beyond a peak power threshold, the creation is observed of a reflected pulse, with a high efficiency (up to 90%) which is phase conjugated with the incident wave.

If this performance is achieved in the case of single incident pulses, nevertheless the fact of raising the repetition rate leads to a drop or to fluctuations in reflectivity as a function of time, which is correlated with a degradation in the quality of the phase conjugation (fidelity). These harmful effects are certainly due to the heating of the non-linear medium as a result of its non-zero absorption, which leads to the formation of turbulences which degrade the process.

Several solutions have already been envisaged for overcoming this reduction in performance at high rate. These solutions provide for circulating the fluid in the gas cell so as to renew it in the interaction zone with each pulse. This solution requires the production of laminar fluxes in the interaction region and complicates the use of phase conjugation mirrors in systems where the size constraints are severe.

SUMMARY OF THE INVENTION

The invention provides for displacing the interaction zone in the active medium with the aid of appropriate optical means so that this interaction zone is different from one pulse to the next.

Moreover, according to the invention, this displacement is done without any movement of the active medium.

The invention therefore relates to a device of the reflectivity (sic) of a phase conjugation mirror, characterised in that it includes a means of displacing relative to the mirror an incident beam to be reflected.

A device for focusing the incident beam enables the incident beam to be focused at a point situated inside the phase conjugation mirror.

The means of displacement then make it possible to displace the focusing point inside the phase. conjugation mirror.

BRIEF DESCRIPTION OF THE DRAWINGS

The various subjects and characteristics of the invention will emerge in the description which will follow and in the attached figures which represent.

DETAILED DESCRIPTION OF THE PREFERRED EMBODIMENT

Before describing the illustrative embodiments of the invention, it is expedient to point out that these examples may contain characteristics specific to themselves but which are not necessarily essential characteristics of the invention.

The essential characteristic of the invention is that the beam to be reflected is displaced relative to the phase conjugation mirror.

Figure 1:
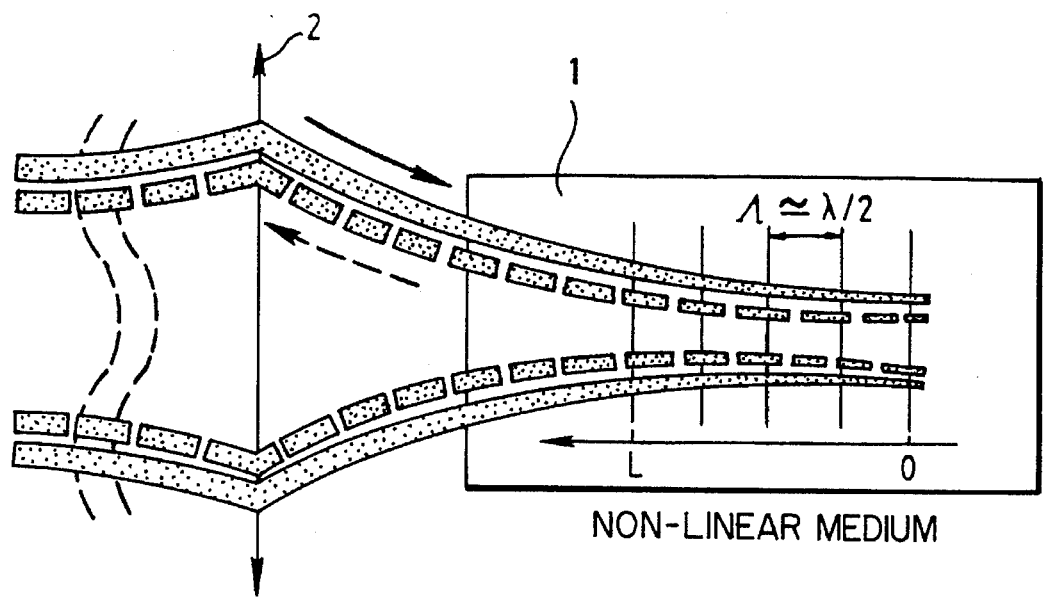
FIG. 1, the functioning of a phase conjugation mirror already described earlier.
Figure 2A:
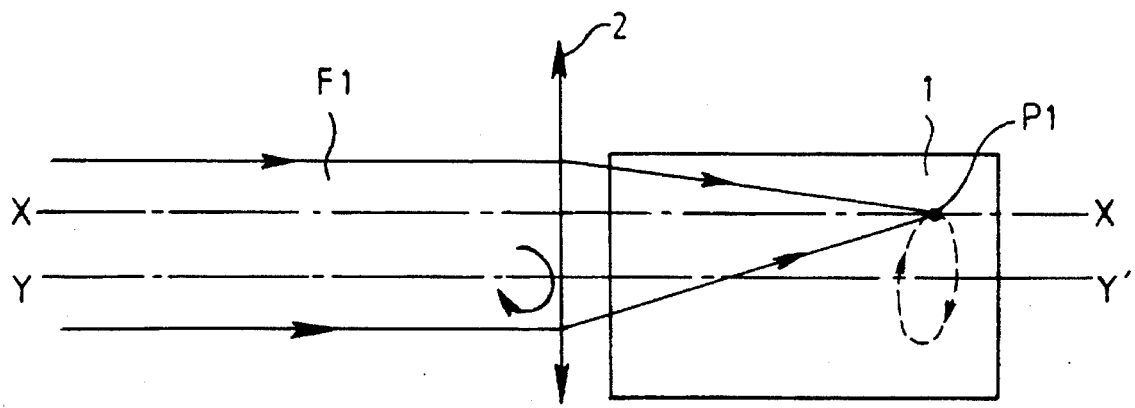
FIGS. 2a and 2b, an illustrative embodiment of the device of the invention in which the focusing point moves over a circle in a plane perpendicular to the optical axis of the system.

The device of FIG. 2a is the simplest solution a problem posed (sic).

Figure 2B:
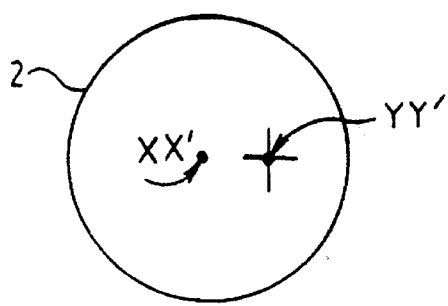

This solution, which is the simplest since it makes it possible to not append any additional optical element in the path of the beam, is represented in FIG. 2. In this case, the local point describes a circle, this making it possible to avoid dissipating too much thermal energy always at the same location in the non-linear medium.

Experimental measurements have made it possible to demonstrate the stabilizing of the reflectivity with this device at 10 Hz repetition rate.

The illustrative embodiment of the device of the invention of FIG. 2a includes a focusing lens 2 placed in the path of a beam F1 and in front of the phase conjugation mirror 1. The beam F1 is therefore focused at a point P1 contained inside the phase conjugation mirror. The phase conjugation mirror is preferably constituted by a medium in a non-linear material with which the focusing lens 2 is associated.

The focusing lens 2 possesses an axis of rotation YY' which does not coincide with the optical axis XX' of the lens. Means, not shown, make it possible to rotate the lens 2 about its axis YY'. The incident beam F1 is transmitted parallel to the axis of rotation YY'.

The focusing point P1 lies on the axis XX'. When the lens rotates about its axis YY', the axis XX' rotates about the axis YY'. The point P1 also rotates about the axis YY' and describes a circle situated in a plane perpendicular to the axis XX'. Moreover, the device of FIG. 2a may include means for displacing the axis YY' relative to the axis XX'. By displacing the axis YY' the radius of the circle described by the point P1 will then change.

According to FIG. 2a, the axes XX' and YY' are parallel, and the beam F1 is parallel to these axes.

Figure 3:
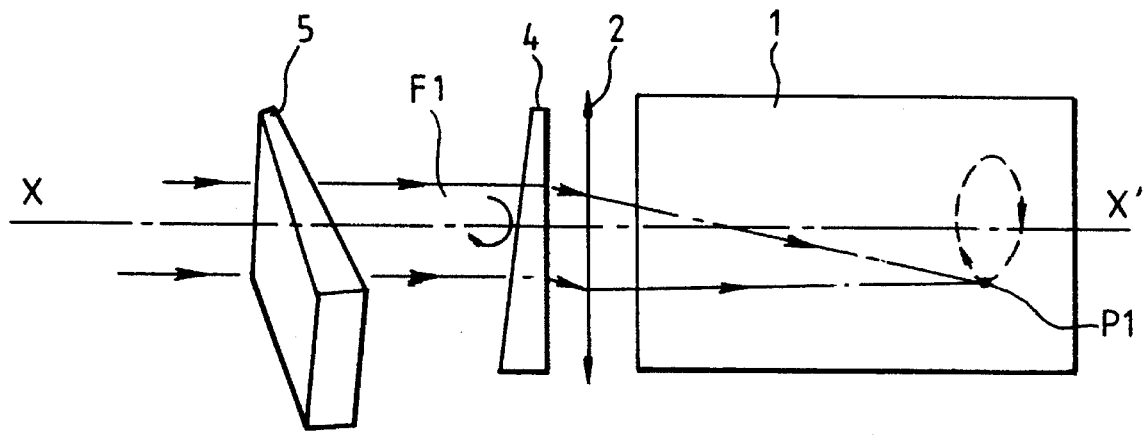
FIG. 3, a variant embodiment of the device of FIGS. 2a and 2b.

FIG. 3 represent (sic) a device in which a rotating prismatic plate 4 is inserted in front of the focusing lens 2 and makes it possible to secure the same function as earlier. The association of two rotating plates 4 and 5 enables the focal point to be made to describe a more complex figure, minimizing the number of pulses at the same point of the cell 1.

The prismatic plate 4, according to the example of FIG. 3, is placed on the optical axis XX' of the lens 2 and rotates about this axis. The point P1 can therefore describe a circle in a plane perpendicular to the axis XX'.

The possible presence of the second prismatic plate 5 makes it possible to vary the angle of incidence of the beam F1 on the entrance face of the plate 4. By rotating the plate 5, it is therefore possible to modify the radius of the circle described by the point P1.

According to a variant embodiment of FIG. 3, one or other of the plates 4 or 5, or both plates, may each oscillate about an axis perpendicular to the axis XX'.

In the absence of rotation of these plates about the axis XX', the point P1 suffers a linear displacement.

When the oscillation of the one, the other or both plates is combined with their rotation about the axis XX', it is possible to obtain any displacement of the point P1 over any chosen curve and it is possible in particular, as was stated earlier, to describe circles of different diameters.

Figure 4:
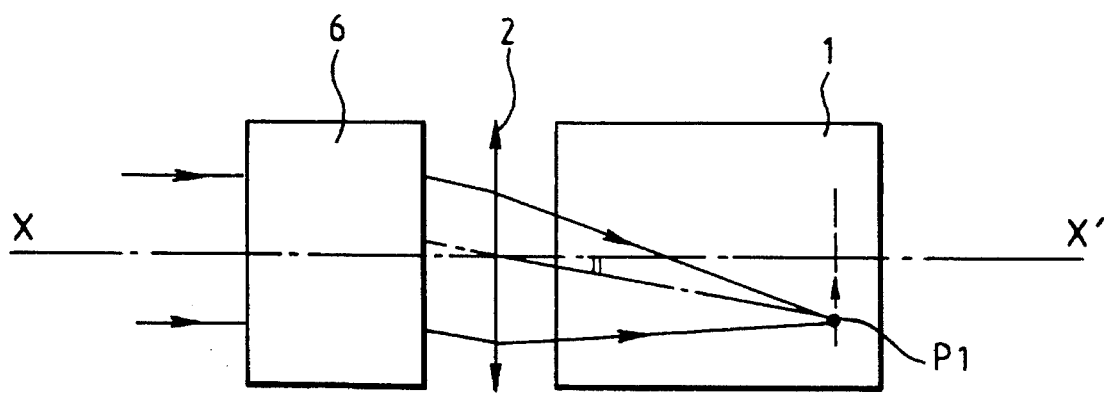
FIG. 4, an illustrative embodiment of the device of the invention in which the focusing point moves over a line in a plane perpendicular to the optical axis of the system.

The device of FIG. 4 includes an acousto-optic deflector 6. This type of deflector is known in the art. It is endowed with a piezo-electric transducer which makes it possible, depending on the frequency of the electrical signal and hence of the acoustic signal which it transmits, to induce a deflection of the beam F1 by a specified angle. Under the influence of the acousto-optic deflector 6, the point P1 is therefore subjected to a linear displacement in a plane perpendicular to the axis XX'.

The type of device of FIG. 4 can be combined with one of the previous devices in order to combine a linear displacement of the point P1 with a circular displacement.

The device of FIG. 4 can also be associated with means, not shown, enabling it to rotate about the axis XX'.

For a frequency of operation of the acousto-optic deflector 6, the beam F1 is deflected by a specified angle and the point P1 describes a circle of a specified radius when the deflector 6 is rotated about the axis XX'. For another frequency applied to the deflector 6, the angle of deflection of the beam F1 takes another value and the radius of the circle, described by the point P1 when the deflector rotates, [sic] about the XX' axis takes another value.

These various solutions can be combined with a multifocus focusing lens which divides the incident energy and therefore the thermal load deposited at each point by the number of foci.

It is perfectly obvious that the foregoing description has been undertaken merely by way of example and that other variants may be envisaged. The forms of embodiment in particular may differ, the essential feature being to displace the beam to be reflected relative to the mirror.

We claim:

1. A device for stabilizing the reflectivity of a phase conjugation mirror, said device comprising:

a focusing means for focusing an incident beam to be reflected onto a focusing point situated inside said phase conjugation mirror;

means for changing the direction of said incident beam;

displacing means for displacing said incident beam and thereby displacing said focusing point of the incident beam in the phase conjugation mirror.

2. Device according to claim 1, wherein the phase conjugation mirror is a mirror having phase conjugation through stimulated Brillouin scattering.

3. Device according to claim 1, wherein said means for displacing the focusing point of the incident beam displaces said focusing point in a plane situated in the phase conjugation mirror.

4. Device according to claim 1, wherein the focusing means possesses an optical axis which is off-centered relative to the axis of the incident beam and is endowed with a means enabling the focusing device to be rotated about its optical axis.

5. Device according to claim 1, wherein the means of changing the direction of the incident beam is at least one movable prism.

6. Device according to claim 5, wherein the prism has an axis of rotation perpendicular to one of its entrance and exit faces, and positioned parallel to the axis of the incident beam.

7. Device according to claim 5, wherein the prism has an axis of rotation parallel to one of an entrance and exit face and said prism is positioned so as to be perpendicular to the axis of the incident beam.

8. Device according to claim 1, wherein the means for displacing includes an acousto-optic deflector.

* * * * *